Aug. 11, 1942.          C. W. MOTT          2,292,961
                  LIFT DEVICE FOR IMPLEMENTS
              Filed June 26, 1940          2 Sheets-Sheet 1
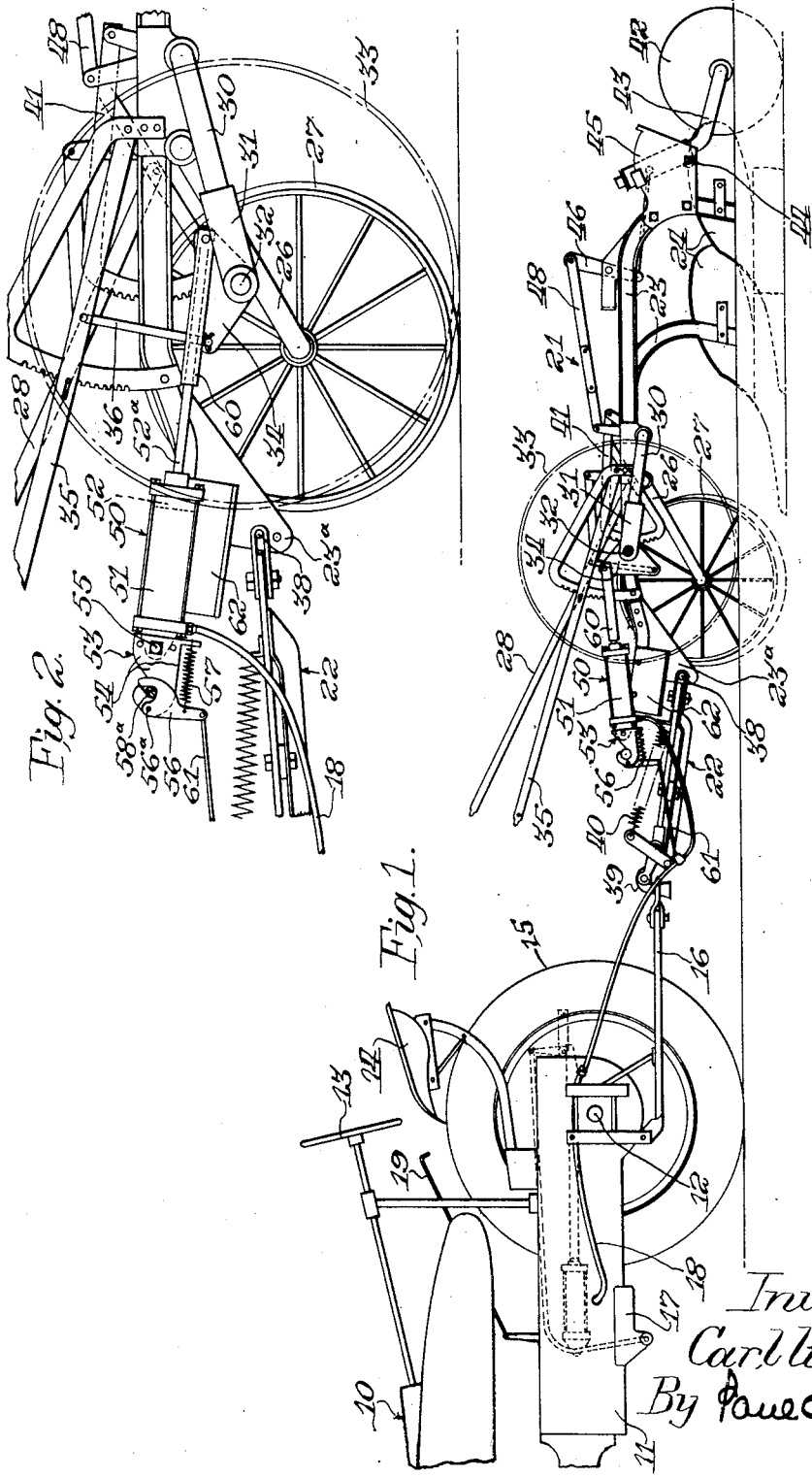
Inventor
Carl W. Mott
By Paul O. Pippel
Atty.

Aug. 11, 1942.  C. W. MOTT  2,292,961
LIFT DEVICE FOR IMPLEMENTS
Filed June 26, 1940  2 Sheets-Sheet 2

Inventor
Carl W. Mott
By Paul O. Pippel
Atty.

Patented Aug. 11, 1942

2,292,961

UNITED STATES PATENT OFFICE 2,292,961

LIFT DEVICE FOR IMPLEMENTS

Carl W. Mott, La Grange, Ill., assignor to International Harvester Company, a corporation of New Jersey Application June 26, 1940, Serial No. 342,475

20 Claims. (Cl. 97—50)

The present invention relates to a power lift device for implements. More specifically it relates to a fluid cylinder device adapted to be mounted on a trail-behind implement.

It is desirable to provide on the frame of a trail-behind implement a power lift device for adjusting the implement. For example, on plows of the type adapted for deep plowing it is desirable to have power lift means for adjusting the depth of the plow, since plowing at greater than average depth makes it practically impossible to adjust the plow by hand. It is also desirable to have releasable hitch means connecting the plow and the tractor so that the plow can break away when it strikes an obstruction.

Since the modern type tractor is now equipped with a hydraulic lift device and cylinders which are adapted to raise and lower implements mounted on the tractor, it is desirable to adapt the cylinders provided on the tractor to trail-behind implements so that the trail-behind implements may be adjusted by power. Inasmuch as the implement is releasably connected to the tractor, it is essential that the power lift device also be releasably mounted on the implement.

It is, therefore, an object of the present invention to provide a power lift device for a trail-behind implement which will adjust the implement to different operating positions and which will also raise the implement to a transport position.

Another object of the present invention is to provide a novel mounting for a power lift device.

Another object of the invention is to releasably mount a power lift device on a trail-behind implement.

Another object of the invention is to provide means for disconnecting the power lift mechanism from the implement upon operation of the releasable hitch means connecting the implement and the tractor.

According to the present invention a fluid cylinder device is releasably mounted on the plow frame and is operably associated with the wheels supporting the plow in such a manner that the plow frame can be adjusted upwardly or downwardly. The plow is connected to a tractor by a releasable hitch connection. The fluid cylinder device is connected to a power plant provided on the tractor and is controlled by the operator on the tractor. The fluid cylinder device is also releasably mounted on the plow in such a manner that upon release of the hitch, the fluid cylinder device is disconnected from the plow frame.

These and other objects and advantages of the present invention will become apparent to those skilled in the art after a consideration of the following detailed description of the preferred structural embodiment, reference being had to the accompanying drawings, in which:

Figure 1 is a side view of a tractor with one wheel removed, with a plow connection thereto and the novel fluid cylinder device mounted thereon;

Figure 2 is an enlarged view showing in detail the fluid cylinder device mounted on the plow frame with the frame of the plow in a raised position;

Figure 3:
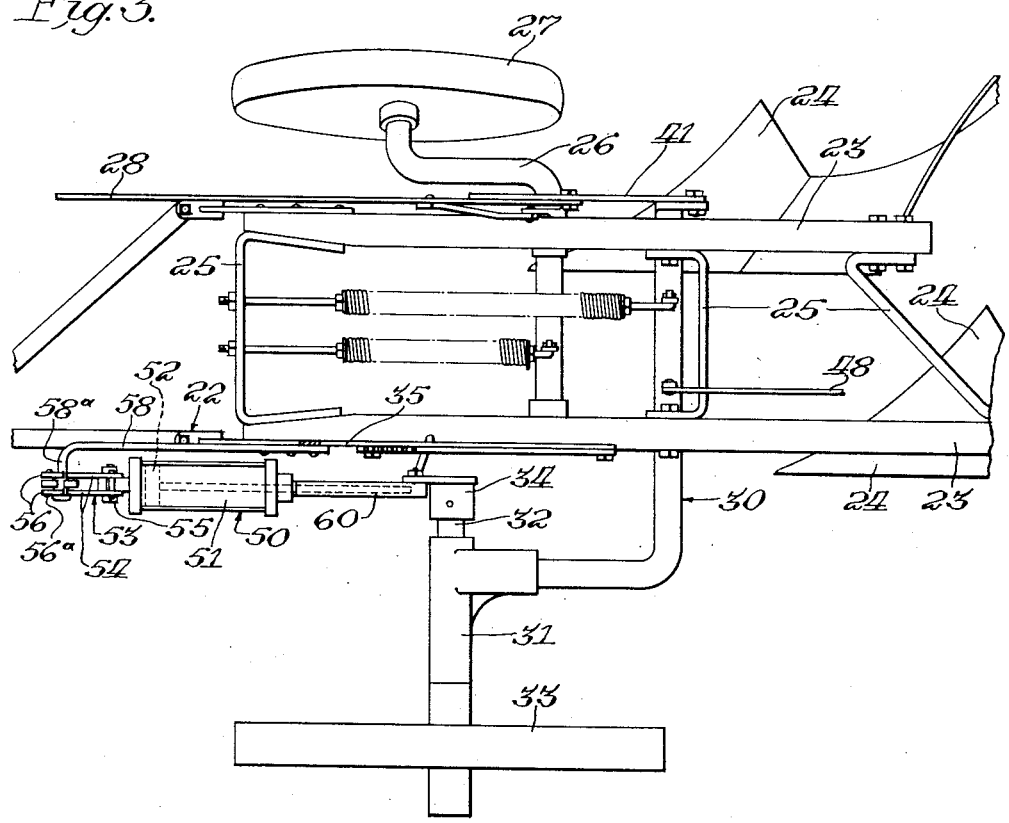
Figure 3 is an enlarged plan view of the plow.

Referring to the drawings there is shown in Figure 1 the usual tractor 10 which consists of a body portion 11, rear axles 12, a steering wheel 13, and an operator's station 14. Wheels 15 are adjustably secured on the axles 12. A draw-bar 16 is connected to the rear of the body portion 11 in the usual manner. The tractor 10 also includes a power plant in the form of a hydraulic pump 17 which is provided within the body portion 11. The pump 17 is of the conventional type adapted to supply fluid into a fluid conduit 18. The pump 17 is controlled by a lever 19 positioned near the operator's station 14.

A plow 21 is trailingly connected to the drawbar 16 of the tractor by a releasable hitch 22. The plow 21 consists of a pair of longitudinally disposed beams 23 to which are secured the usual plow bottoms 24. The beams 23 are held in spaced relation by transverse members 25. A crank axle 26 is pivotally mounted on the longitudinally disposed beams 23 and has a furrow wheel 27 journaled thereon. On one of the beams 23 is mounted a lever 28 which is connected to the crank axle 26 in the usual manner so as to adjust the wheel 27. A crank 30 is also journaled on the beams 23 and has a part 31 secured thereto in which is rotatably mounted an axle 32. A land wheel 33 is journaled at one end of the axle 32, and an arm 34 is secured at the other end thereof. A lever 35 mounted on one of the beams 23 adjacent the crank 30 has a link 36 connected thereto and to the arm 35 whereby upon movement of the lever 35 adjustment of the crank 30 is effected. The releasable hitch 22 is pivotally connected by means of bolts 38 to the plate members 23a secured to the front ends of the beams 23.

The releasable hitch device 22 consists of a pivoted dog 39 which is adapted to be connected to the draw-bar 16 and which is held in its connected position to the tractor by the spring 40. Since the releasable hitch device is old and well known to those skilled in the art, it is believed that this description will suffice.

The lever 28 adjusts the furrow wheel 27 to level the plow. The lever 35 adjusts the land wheel 33 and the furrow wheel 27 by virtue of the link 41 connected between the crank axle 26 and the crank 30. The usual rear furrow wheel 42 is mounted on the rear of the beams 23 by means of an axle 43 which is pivotally connected by a bolt 44 to a plate 45 secured to the beam 23. A bell crank 46 and links 48 connected to the crank 30 and to the axle 43 adjusts the rear furrow wheel 42 upon operation of the lever 35.

Figure 4:
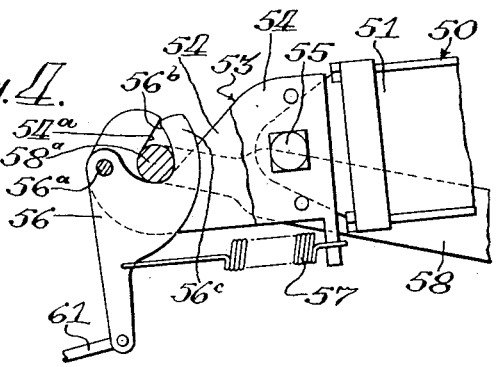
Figure 4 is a detail view of the releasable latch means for the fluid cylinder device in a locked position; and, Figure 5 is an enlarged detail view of the fluid cylinder device in an unlocked position.

A power lift in the form of a fluid cylinder device 50 is provided on the plow 21. The fluid cylinder device 50 consists of a cylinder 51 in which is slidably mounted a piston 52 having an extension 52a. At one end of the cylinder 51 there is provided a latch means 53 that consists of a pair of spaced plates 54 which are connected to the cylinder by means of a bolt 55. The ends of the plates 54 each have a reentrant portion 54a. A lever 56 is pivotally mounted between the plates 54 by means of a bolt 56a. The lever 56 also has a reentrant portion 56b and a lip portion 56c. The lip portion 56c of the lever 56 encloses the reentrant portions 54a of the plates 54 as shown in Figure 4. A spring 57 connects the lever 56 and the cylinder 51. A member or plate 58 secured to the front of the beam 23 has an offset portion 58a.

On the arm 34 of the axle 32 is pivotally connected a tubular member 60 which is adapted to receive the extension 52a of the piston 52. The member 60 and the extension 52a form a slide and guide connection between the cylinder 51 and the part 34. The latch means 53 is connected to the offset portion 58a of the plate 58.

The fluid conduit 18 connected to the hydraulic pump on the tractor is connected to the cylinder 51. On moving the lever 19 fluid is delivered through the conduit 18 into the cylinder 51 and moves the piston 52 which rotates the arm 34 about the axle 32. Upon moving the lever 35, the link 36 moves the frame up or down.

Figure 5:
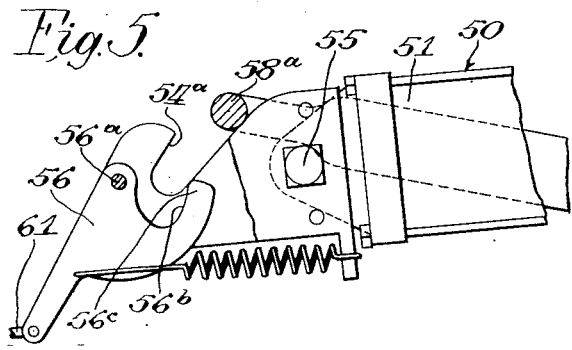

During the operation of the plow the depth of the plow can be adjusted by the operator of the tractor. In the event the plow bottoms 24 strike an obstruction, the pivoted dog 39 of the releasable hitch 22 is disengaged from the tractor draw-bar. The fluid cylinder device is released from its mounting on the plow upon operation of the releasable hitch by means of a link 61 which is connected to the lever 54 and to the conduit 18. As shown in Figure 5, the conduit 18, through the link 61, moves the lever 54 out of engagement with the offset portion 58a of the plate 58, and the fluid cylinder device consisting of the cylinder 51, the piston 52, and the latch 53 is disconnected from the plow. The piston 52 slides out of engagement with the tubular member 60 and the fluid cylinder device 50 is pulled off the plow by the fluid conduit 18.

A plate 62 secured to the beam 23 deflects the cylinder to the side of the hitch as it is disconnected from the plow. To reconnect the fluid cylinder device to the plow the operator need only back up the tractor and reconnect the releasable hitch device 22 to the tractor draw-bar 16. The extension 52a of the piston 52 is inserted in the tubular member 60 and the lever 54 is moved so as to permit the latch means 53 to be reconnected to the offset portion 58a.

From the foregoing description it will be apparent that a novel power lift device has been applied to a plow. The plowing depth of the plow can be controlled by the operator on the tractor, and the fluid cylinder device releasably mounted on the plow frame can be quickly and easily applied thereto. The releasable mounting of the fluid cylinder device 50 prevents breaking of the fluid conduit 18, since the latch means 53 disconnects the fluid cylinder device from the plow upon operation of the releasable hitch device which connects the plow to the tractor.

Although the invention has been explained by description in detail to the specific embodiment thereof, it is to be understood that various changes and modifications can be made in the particular construction shown without departing from the invention, and that the invention is to be limited only within the extent set forth in the appended claims.

What is claimed is:

1. In combination, a tractor, an implement, a releasable hitch connecting the implement and the tractor, a cylinder releasably positioned on the implement, a piston within the cylinder for adjusting said implement by movement of said piston in the cylinder, a conduit connecting the tractor and the cylinder, and means connecting the conduit and the cylinder for releasing the cylinder from the implement upon release of the hitch.

2. In combination, a tractor, an implement, a releasable hitch connecting the implement and the tractor, a cylinder releasably positioned on the implement, a piston within the cylinder for adjusting said implement by movement of said piston in the cylinder, a conduit connecting the tractor and the cylinder, and means connecting the tractor and the cylinder for releasing the cylinder from the implement upon release of the hitch.

3. In combination, a tractor, an implement a releasable hitch connecting the implement and the tractor, a cylinder releasably positioned on the implement, a piston within the cylinder for adjusting said implement by movement of said piston in the cylinder, a conduit connecting the tractor and the cylinder, and means operatively connecting the releasable hitch and the cylinder for releasing the cylinder from the implement upon release of the hitch.

4. In combination, a tractor, an implement having adjustable wheels, a releasable hitch for trailingly connecting the implement to said tractor, a fluid cylinder device releasably carried by the implement and operatively connected to the wheels to operate the same, a fluid conduit connected between the tractor and the fluid cylinder device to effect operation of the same, and means for automatically effecting release of the cylinder device from the implement upon release of the implement from the tractor.

5. In combination, a tractor, an implement, a crank axle pivotally mounted on the implement, a furrow wheel journaled on the crank axle, a crank pivotally mounted on the implement and having a journal portion, means for interconnecting the crank axle and the crank, an axle provided within said journal, a land wheel rotatably mounted on said axle, an arm on said axle, a lever mounted on said implement, a link connected to said lever and to said arm for adjusting said crank axle and crank, a fluid cylinder device releasably carried by the implement and operatively associated with the arm on the axle to effect adjustment of said crank axle and crank, a fluid conduit connected between the tractor and the fluid cylinder device to effect operation of the same, and means for automatically effecting release of the cylinder device from the implement upon release of the implement from the tractor.

6. In combination with a frame having wheels adjustably mounted thereon and a fluid cylinder device having a piston and disposed between the frame and the adjustably mounted wheels for adjusting the frame with respect to the wheels, of means for mounting said fluid cylinder device comprising latch means connecting the cylinder to the frame, and means connecting the piston and the wheels and comprising members slidably connected with one another.

7. In combination with a frame having parts adjustably mounted thereon and a fluid cylinder device having a piston and associated with said frame to effect adjustment of said parts, of means for mounting said fluid cylinder device comprising latch means connecting the cylinder to the frame, and slide and guide means connecting the piston and the parts.

8. In combination, first and second members movably connected with one another and a fluid cylinder device having a piston and associated with said members for adjusting the first member relative to the second member, and means connecting the fluid cylinder device to said members comprising latch means connecting the cylinder and one member and means slidingly and guidingly connecting the piston and the other member.

9. In combination, first and second members movably connected with one another and a power lift device associated with said members for adjusting the first member relative to the second member, means connecting the power lift device to said members comprising latch means connecting one end of the power lift device to one member, and means slidingly and guidingly connecting the power lift device to the other member.

10. In combination with a frame having parts adjustably mounted thereon and a fluid cylinder device having a piston and operatively associated with said frame to effect adjustment of said parts, of means for mounting said fluid cylinder device comprising latch means connecting the cylinder to the frame, and a tubular member pivotally associated with said adjustable parts and adapted to receive said piston.

11. In combination with a frame having parts adjustably mounted thereon and a fluid cylinder device having a piston and associated with said frame to effect adjustment of said parts, of means for mounting said fluid cylinder device comprising a member secured to said frame, said cylinder having latch means adapted to be pivotally associated with said member, and a tubular member pivotally associated with said adjustable parts and adapted to receive said piston.

12. In combination, a tractor, an implement having adjustable wheels, a releasable hitch for trailingly connecting the implement to said tractor, a fluid cylinder device having a piston movably mounted therein, latch means for releasably mounting said cylinder on the implement, a tubular member pivotally associated with said adjustable wheels and adapted to receive said piston, a fluid conduit connected between the tractor and the fluid cylinder device to effect operation of the same, and means for automatically effecting release of the cylinder from the implement and the piston from the tubular member upon release of the implement from the tractor.

13. In combination, a tractor having an operator's station, a trail-behind implement, means for manually adjusting said implement accessible to the operator's station on the tractor, hitch means connecting the implement and the tractor, a cylinder positioned on the implement, a piston within the cylinder for adjusting the implement by movement of said piston within the cylinder, and a conduit connecting the tractor and the cylinder for moving the piston whereby the implement may be adjusted by movement of the piston within said cylinder or adjusted by the manual adjusting means.

14. In combination, a tractor having a hydraulic pump mounted thereon and adapted to be driven from the motor of the tractor, control means for said pump, a frame, crank axles pivotally mounted on said frame, wheels journaled on said crank axles, link means connecting said crank axles, earth-working tools mounted on said frame, a draft device provided at the front of the frame, a releasable hitch device mounted on the draft device and adapted to be coupled to said tractor, a cylinder having a fluid operated piston releasably mounted on said frame, a sleeve pivotally connected to one of the crank axles and adapted to receive said piston, a fluid conduit connected to said pump and to said cylinder for supplying fluid to said cylinder to effect raising or lowering of the frame upon actuation of said pump control means, a lever pivotally associated with the pivotal mounting of the cylinder and adapted to release the cylinder from its pivotal connection to the frame upon movement of said lever, and a link connected to said lever and to said fluid conduit in such a manner that when the earth-working tools strike an obstruction the releasable hitch device will disconnect from its pivotal connection to the tractor and the conduit and link will move the lever about its pivotal connection and disconnect the cylinder from its pivotal connection to the frame.

15. In combination, a tractor having a hydraulic pump mounted thereon and adapted to be driven from the motor of the tractor, control means for said pump positioned near an operator's station on said tractor, a plow having a frame, a first and second crank axle pivotally mounted on said frame, a land wheel journaled on the first crank axle, manually operable means mounted on said frame and operatively connected to said first crank axle for adjusting the same, a furrow wheel journaled on the second crank axle, manually operable means mounted on said frame and operatively connected to said crank axles for adjusting both of said axles simultaneously about their pivotal connection to the frame, a draft device pivotally connected to the front of the plow frame, a releasable hitch device mounted on the draft device and adapted to be coupled to said tractor, a cylinder having a fluid operated piston pivotally mounted on the plow frame, a sleeve pivotally mounted on one of the crank axles and adapted to receive said piston, a fluid conduit connected to said pump and to said cylinder for supplying fluid to said cylinder to effect raising or lowering of the plow frame upon actuation of said pump control means, a lever pivotally associated with the pivotal mounting of the cylinder and adapted to release the cylinder from its pivotal connection to the frame upon movement of said lever, and a link connected to said lever and to said fluid conduit whereby when the plows strike an obstruction the releasable hitch device will disconnect from its connection to the tractor and the conduit and link will move the lever about its pivotal connection and disconnect the cylinder from its pivotal connection to the plow frame.

16. In combination, a tractor, an implement, disconnectable means connecting the implement and the tractor, a fluid cylinder device removably mounted on the implement, means for supplying fluid to the fluid cylinder device, and means connected to the fluid cylinder device and to the tractor for disconnecting said device from the implement.

17. In combination with a frame having a part adjustably mounted thereon and a fluid cylinder device having a piston and associated with said frame to effect adjustment of said part, of means for mounting said fluid cylinder device comprising latch means connecting the cylinder to the frame, and releasable means connecting the piston and the part.

18. In combination, a tractor, an implement, disconnectable means connecting the implement and the tractor, a fluid cylinder device removably mounted on the implement, and means for supplying fluid to the fluid cylinder device and for disconnecting the device from the implement upon release of said disconnectable means.

19. In combination, a tractor, an implement, disconnectable means connecting the implement and the tractor, a fluid cylinder device removably mounted on the implement, means for supplying fluid to the fluid cylinder device, and means for disconnecting the device from the implement upon release of said disconnectable means.

20. In combination, a tractor having a fluid supply means, an implement, disconnectable means connecting the implement and the tractor, a fluid cylinder device removably mounted on the implement and operably connected to the implement to adjust a part thereof, means for supplying fluid under pressure from the supply means on the tractor to the fluid cylinder device, and means operable to disconnect the cylinder device from the implement upon separation of the implement from the tractor.

CARL W. MOTT.